US010773467B2

(12) United States Patent
Tsotsis

(10) Patent No.: US 10,773,467 B2
(45) Date of Patent: Sep. 15, 2020

(54) INTERLAYER-TOUGHENED FILAMENT-WOUND COMPOSITE STRUCTURE

(71) Applicant: The Boeing Company, Chicago, IL (US)

(72) Inventor: Thomas Tsotsis, Santa Ana, CA (US)

(73) Assignee: The Boeing Company, Chicago, IL (US)

(*) Notice: Subject to any disclaimer, the term of this patent is extended or adjusted under 35 U.S.C. 154(b) by 133 days.

(21) Appl. No.: 15/380,963

(22) Filed: Dec. 15, 2016

(65) Prior Publication Data

US 2018/0169930 A1 Jun. 21, 2018

(51) Int. Cl.
| | |
|---|---|
| *B29C 69/00* | (2006.01) |
| *B29C 53/58* | (2006.01) |
| *B29K 101/12* | (2006.01) |
| *B29K 105/08* | (2006.01) |
| *B29B 15/12* | (2006.01) |

(52) U.S. Cl.
CPC ............ *B29C 69/002* (2013.01); *B29C 53/58* (2013.01); *B29C 53/582* (2013.01); *B29B 15/122* (2013.01); *B29K 2101/12* (2013.01); *B29K 2105/0809* (2013.01)

(58) Field of Classification Search
CPC ..... B29C 69/002; B29C 69/003; B29C 53/56; B29C 53/582
USPC .................................................. 156/191, 192
See application file for complete search history.

(56) References Cited

U.S. PATENT DOCUMENTS

| | | | |
|---|---|---|---|
| 4,495,021 A * | 1/1985 | Goldsworthy | ........ B29C 53/564 156/172 |
| 5,192,390 A * | 3/1993 | Perkins | .................... B26D 7/20 156/117 |
| 7,435,693 B2 | 10/2008 | Tsotsis et al. | |
| 8,246,882 B2 | 8/2012 | Tsotsis | |
| 8,361,262 B2 | 1/2013 | Tsotsis et al. | |
| 8,372,231 B1 | 2/2013 | Tsotsis | |
| 8,388,795 B2 | 3/2013 | Tsotsis | |
| 8,607,835 B2 | 12/2013 | Tsotsis | |
| 8,657,990 B2 | 2/2014 | Tsotsis | |
| 8,852,713 B2 | 10/2014 | Tsotsis | |
| 2005/0257887 A1 | 11/2005 | Tsotsis | |
| 2007/0175572 A1* | 8/2007 | Rubin | ................... B29C 70/525 156/196 |
| 2009/0236091 A1* | 9/2009 | Hammami | .......... B29C 53/8016 166/242.1 |
| 2010/0003881 A1 | 1/2010 | Tsotsis | |

(Continued)

OTHER PUBLICATIONS

Lingang, "Investigations on damage resistance of carbon fiber composite panels toughened using veils," Chinese Journal of Aeronautics, 2013, pp. 807-813, Elsevier Ltd.

(Continued)

*Primary Examiner* — Christopher T Schatz
(74) *Attorney, Agent, or Firm* — Kunzler Bean & Adamson

(57) ABSTRACT

Disclosed herein is a method for filament winding. The method includes bonding a veil material to the unidirectional fabric to veil-stabilize the unidirectional fabric. The method also includes slitting the veil-stabilized unidirectional fabric to separate a veil-stabilized fabric portion. The method also includes directing the veil-stabilized fabric portion to an application head. The method also includes winding the veil-stabilized fabric portion on a winding mandrel.

20 Claims, 4 Drawing Sheets

(56) References Cited

U.S. PATENT DOCUMENTS

2013/0316172 A1 11/2013 Shanov et al.
2015/0174872 A1 6/2015 Bonneau et al.
2018/0162092 A1 6/2018 Tsotsis et al.

OTHER PUBLICATIONS

Tsotsis, "Interlayer Toughening of Composite Materials," Polymer Composites, 2009, vol. 30, pp. 70-86, Wiley InterScience.

* cited by examiner

INTERLAYER-TOUGHENED FILAMENT-WOUND COMPOSITE STRUCTURE

FIELD

This disclosure relates generally to composite material manufacturing, and more particularly to composite stabilization and systems and methods for winding stabilized composites.

BACKGROUND

Composite materials provide a desirable balance of qualities such as strength, volume, weight, and cost, as well as certain chemical and thermal properties. Fiber-reinforced composites typically include fibers within a polymer matrix. The strength and stiffness of the fibers compliments the characteristics of the matrix to provide material qualities which are desirable in disciplines such as aerospace, automotive, structural, sporting goods, electronics, energy generation, chemical processes, material transport, and an increasing number of consumer, industrial, and technical areas.

Fiber-reinforced composites are sometimes created by building up successive layers of fiber fabrics. The fabrics may then be assembled into a form that exactly or generally matches a particular part or according to a particular application. The fibers may be coated or infused with the matrix during the formation of the layered fabrics or after the fabric is formed into the shape of a target form.

One manner of producing the target form is by winding. Filament winding is a fabrication technique in which fibers are wound under tension onto a rotating mandrel. The fibers may pass through a resin bath prior to being applied to the mandrel or may be infused with the resin or other matrix while on the mandrel or after removal from the mandrel. The fibers may be applied at different angles, patterns, and thicknesses to impart corresponding characteristics to the part being formed.

Fiber-reinforced composites, in some applications, benefit from the introduction of an additive or filler to further stabilize and toughen the part. However, creating a stabilized composite structure using filament winding can be a challenge. Additives can be mixed into the resin bath prior to winding, but performance can be impacted by quality of mixing and the degree of dispersion. This approach does not address the toughening or stabilization of dry-fiber, filament-wound parts that are not infused until after winding is complete.

SUMMARY

The subject matter of the present application has been developed in response to the present state of the art, and in particular, in response to the shortcomings of traditional composite manufacturing methods and systems, that have not yet been fully solved by currently available techniques. Accordingly, the subject matter of the present application has been developed to provide a filament winding method, and associated systems, that overcomes at least some of the above-discussed shortcomings of prior-art techniques.

Disclosed herein is a method of filament winding. The method includes bonding a veil material to a unidirectional fabric to veil-stabilize the unidirectional fabric. The method also includes slitting the veil-stabilized unidirectional fabric to separate a veil-stabilized fabric portion. The method also includes directing the veil-stabilized fabric portion to an application head. The method also includes winding the veil-stabilized fabric portion on a winding mandrel. The preceding subject matter of this paragraph characterizes example 1 of the present disclosure.

Bonding the veil material to the unidirectional fabric to veil-stabilize the unidirectional fabric includes applying heat and pressure to the veil material to bond the veil material to the unidirectional fabric. The preceding subject matter of this paragraph characterizes example 2 of the present disclosure, wherein example 2 also includes the subject matter according to example 1, above.

The veil material includes a thermoplastic material and the veil-stabilized fabric portion includes a dry-fiber unidirectional fabric stabilized with a thermoplastic veil. The preceding subject matter of this paragraph characterizes example 3 of the present disclosure, wherein example 3 also includes the subject matter according any one of examples 1-2, above.

The method further includes impregnating the veil-stabilized fabric portion before winding the veil-stabilized fabric portion with a resin before winding the veil-stabilized fabric portion on the winding mandrel. The preceding subject matter of this paragraph characterizes example 4 of the present disclosure, wherein example 4 also includes the subject matter according to any one of examples 1-3, above.

The method further includes infusing the wound veil-stabilized fabric portion with a resin on the winding mandrel. The preceding subject matter of this paragraph characterizes example 5 of the present disclosure, wherein example 5 also includes the subject matter according to any one of examples 1-4, above.

The method further includes removing the wound veil-stabilized fabric portion from the mandrel as a flat laminate. The preceding subject matter of this paragraph characterizes example 6 of the present disclosure, wherein example 6 also includes the subject matter according to any one of examples 1-5, above.

The method further includes curing the wound veil-stabilized fabric portion after winding. The preceding subject matter of this paragraph characterizes example 7 of the present disclosure, wherein example 7 also includes the subject matter according to any one of examples 1-6, above.

Also disclosed herein is a filament winding system. The system includes a collection structure, a resin bath, a nip roller, an application head, and a winding mandrel. The collection structure includes a veil-stabilized fabric portion. The resin bath is configured to apply a resin to the veil-stabilized fabric portion. The nip roller is configured to remove excess resin from the veil-stabilized fabric portion. The application head is configured to position the veil-stabilized fabric portion in a winding operation. The winding mandrel is configured to receive the veil-stabilized fabric portion from the application head during the winding operation. The preceding subject matter of this paragraph characterizes example 8 of the present disclosure.

The veil-stabilized fabric portion is formed by bonding a veil to an unstabilized unidirectional fabric with an oven. The preceding subject matter of this paragraph characterizes example 9 of the present disclosure, wherein example 9 also includes the subject matter according to example 8, above.

The oven applies heat and pressure to bond the veil to the unstabilized unidirectional fabric. The preceding subject matter of this paragraph characterizes example 10 of the present disclosure, wherein example 10 also includes the subject matter according to any one of examples 8-9, above.

The veil includes a non-woven thermoplastic fabric. The preceding subject matter of this paragraph characterizes example 11 of the present disclosure, wherein example 11 also includes the subject matter according to any one of examples 8-10, above.

The system further includes a slitter to receive a veil-stabilized unidirectional fabric and separate the veil-stabilized fabric portion from the veil-stabilized unidirectional fabric. The preceding subject matter of this paragraph characterizes example 12 of the present disclosure, wherein example 12 also includes the subject matter according to any one of examples 8-11, above.

The veil-stabilized fabric portion includes multiple veil-stabilized tows. The preceding subject matter of this paragraph characterizes example 13 of the present disclosure, wherein example 13 also includes the subject matter according to any one of examples 8-12, above.

The veil-stabilized fabric portion includes a single veil-stabilized tow. The preceding subject matter of this paragraph characterizes example 14 of the present disclosure, wherein example 14 also includes the subject matter according to any one of examples 8-13, above.

A heating element applies heat to the wound veil-stabilized fabric portion to further bond the veil within the wound veil-stabilized fabric portion. The preceding subject matter of this paragraph characterizes example 15 of the present disclosure, wherein example 15 also includes the subject matter according to any one of examples 8-14, above.

Also disclosed is a method of winding a veil-stabilized composite. The method includes bonding a veil fabric to a unidirectional fabric to veil-stabilize the unidirectional fabric. The method also includes slitting the veil-stabilized fabric to separate a veil-stabilized fabric portion. The method also includes winding the veil-stabilized fabric portion on a winding mandrel. The method also includes infusing the veil-stabilized fabric portion with resin after winding. The preceding subject matter of this paragraph characterizes example 16 of the present disclosure.

The wound, veil-stabilized fabric portion includes a dry-fiber laminate prior to infusing of the veil-stabilized fabric portion with the resin after winding. The preceding subject matter of this paragraph characterizes example 17 of the present disclosure, wherein example 17 also includes the subject matter according to example 16, above.

The method further includes applying heat to the wound veil-stabilized fabric portion to further bond the veil material within the dry-fiber laminate prior to the infusing of the veil-stabilized fabric portion with the resin after winding. The preceding subject matter of this paragraph characterizes example 18 of the present disclosure, wherein example 18 also includes the subject matter according to any one of examples 16-17, above.

The method further includes seam-welding the wound veil-stabilized fabric portion after winding the veil-stabilized fabric portion on the winding mandrel. The preceding subject matter of this paragraph characterizes example 19 of the present disclosure, wherein example 19 also includes the subject matter according to any one of examples 16-18, above.

The method further includes curing the infused veil-stabilized fabric portion after the infusing of the veil-stabilized fabric portion with the resin after winding. The preceding subject matter of this paragraph characterizes example 20 of the present disclosure, wherein example 20 also includes the subject matter according to any one of examples 16-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Embodiments described below relate to veil-stabilizing tows ahead of resin infusion to allow for seamless integration of interlayer toughening in filament-wound structures.

This toughening results in a more uniform, resilient, and cost-effective product. Generally, the filaments described herein are carbon fibers, though the described systems and processes are applicable to other fiber types. Reference throughout this specification to a "tow" relates to a plurality of fibers or filaments which may include coatings applied to achieve a finish or a sizing. Such coatings may include silane-based coating, polyethylene oxide, polyvinyl alcohol, or other organic or inorganic coating materials applied to the fiber. Reference to "filament winding" should be understood to include winding operations using tows, fibers, filaments, or other similar terms of art.

Figure 1:
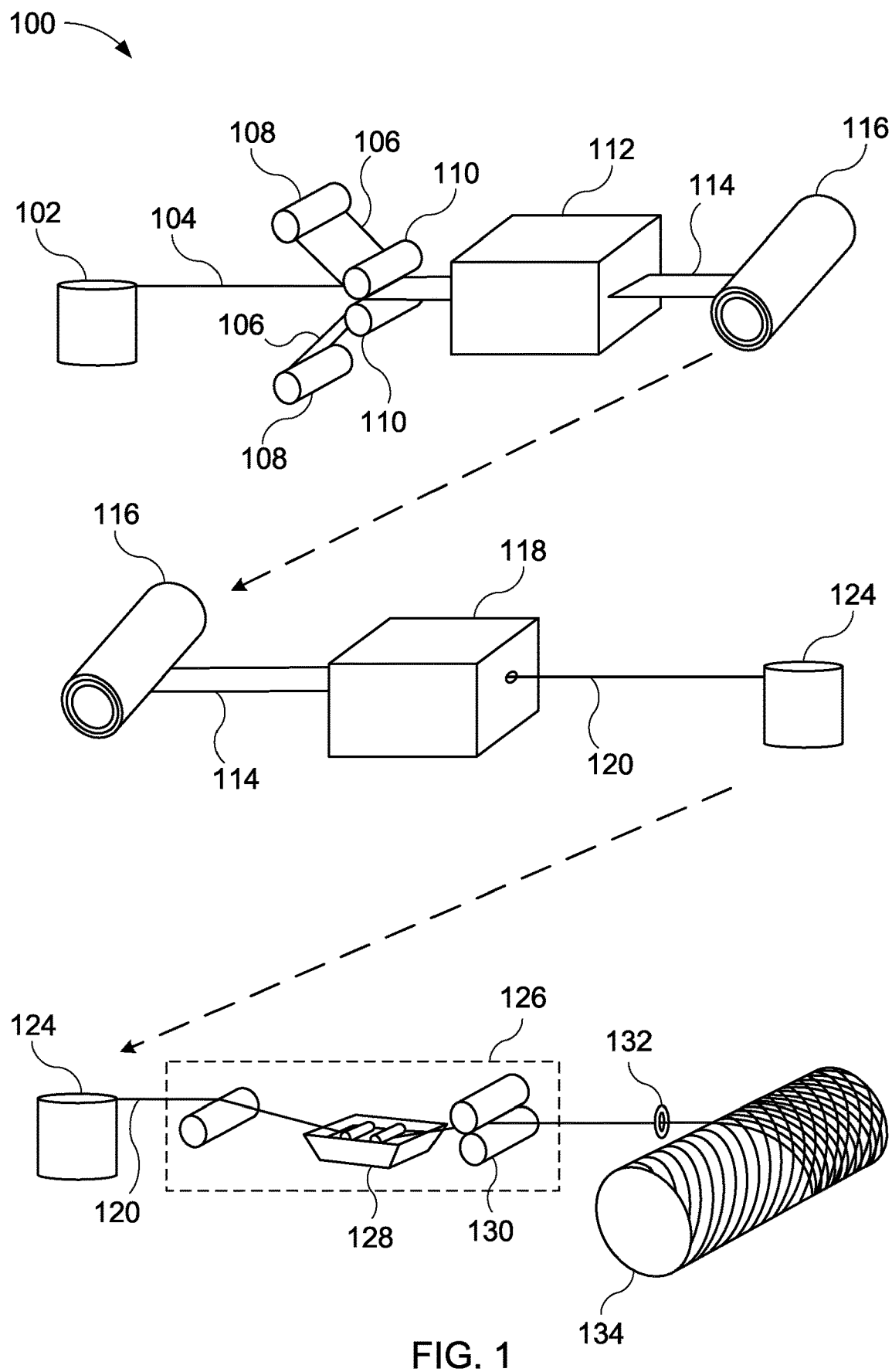
FIG. 1 is a schematic view of a filament winding system, according to one or more embodiments of the present disclosure.

FIG. 1 is a schematic view of a filament winding system 100, according to one or more embodiments of the present disclosure. In the illustrated embodiment, the system 100 includes a fiber creel 102. A tow 104 is drawn from the fiber creel 102. In some embodiments, the tow 104 is a group of one or more fibers or filaments with each tow having a relatively large number of filaments. In other embodiments, the tow 104 includes a relatively small number of filaments. In some embodiments, the tow 104 has a range of filament counts and may have a generally circular or elliptical cross-section. In some embodiments, the system 100 draws multiple tows 104 from multiple creels 102 simultaneously.

In the illustrated embodiment, a veil 106 is applied to the tow 104. In some embodiments, the veil 106 is a non-woven thermoplastic fabric. In some embodiments, at least one of the geometry, structure, and material of the veil 106 is chosen based on one or more factors comprising infusion resin, dry or wet winding, part type, part performance characteristics, or part structure. Other factors may also be taken into consideration in selecting the veil 106.

In other embodiments, the veil 106 is a woven fabric or a melt-blown fabric or other thermoplastic or non-thermoplastic material. Some examples of the veil 106 include one or more of a polyamide, polyimide, polyamide-imide, polyester, polybutadiene, polyurethane, polypropylene, polyetherimide, polysulfone, polyethersulfone, polyphenylsulfone, polyphenylene sulfide, polyetherketone, polyethertherketone, polyarylamide, polyketone, polyphthalamide, polyphenylenether, polybutylene terephthalate, polyethylene terephthalate or other material suitable for bonding to the tow 104.

In the illustrated embodiment, the veil 106 is unrolled from a veil roll 108. In the illustrated embodiment, the veil 106 is applied to the tow 104 by a veil-application roller 110. In other embodiments, the veil 106 is applied by other mechanical, electrical, or chemical processes. In some embodiments, the veil 106 is applied to one or opposite sides of the tow 104. In some embodiments, the veil 106 is applied simultaneously to both upper and lower sides of the tow 104 or in separate operations. In some embodiments, the veil 106 is applied to only one side of the tow 104.

The veil 106 and tow 104 are passed into an oven 112. The oven 112 applies heat to bond the veil 106 to the tow 104. In some embodiments, the oven 112 applies pressure to the veil 106 to further bond the veil 106 to the tow 104. The oven 112 consolidates the tow 104 and veil 106 into a veil-stabilized fabric 114. For clarity, the illustrated embodiment shows a single tow 104 stabilized with the veil 106. In other embodiments, multiple tows 104 are fed from one or more creels 102, after which, the plurality of tows 104 are organized and stabilized with the veil 106. Stabilizing the tows 104 provides advantage when aligning the plurality of tows 104. In some embodiments, the tows 104 are aligned relative to each other, aligned in a straight path, or otherwise oriented in a manner advantageous to subsequent processing such as slitting or winding. In some embodiments, multiple tows 104 are aligned parallel to one another. In some embodiments, the alignment is a generally planar sheet.

In the illustrated embodiment, the veil-stabilized fabric 114 is collected on a roll 116 or other collecting structure. In other embodiments, the veil-stabilized fabric 114 is fed into a slitter 118. In the illustrated embodiment, the veil-stabilized fabric 114 is fed from the roll 116 to the slitter 118. The slitter 118 separates at least a portion of the veil-stabilized fabric 114 to create a veil-stabilized fabric portion 120. For example, the slitter 118 may separate the veil-stabilized fabric 114 into a small or "narrow" veil-stabilized fabric portion having 1,000 or fewer filaments or a large veil-stabilized portion having more than 1,000 filaments. Other quantities or thresholds are also contemplated. Some embodiments omit the slitter 118 and process the veil-stabilized fabric 114 in its original geometry.

The illustrated embodiment the veil-stabilized fabric portion has a cross-section of a substantially flat tape with tows arranged between two veil layers, other embodiments include round or other geometries of the tow, fewer or more veil layers, and relative arrangements of multiple tows and veils. For example, in some embodiments, the veil layers are distinct layers. The veil 106 is sufficiently heated and pressed in the oven 112 to attach the veil 106 to the tow 104 with minor disruption to the morphology of the veil 106. In one embodiment, the veil-stabilized fabric portion 120 is a single veil-stabilized tow. In other embodiments, a plurality of tows are included in the slit veil-stabilized fabric portion 120. For example, a plurality of tows may be at least partially separated from one another within the veil and aligned parallel to one another in the slit veil-stabilized fabric portion 120.

In the illustrated embodiment, the slit veil-stabilized fabric portion 120 is collected on a roll or other collection structure 124. The veil-stabilized fabric portion 120 is fed from the collection structure 124 to a resin applicator 126. In some embodiments, the veil-stabilized tow 120 is fed directly from the slitter 118 to the resin applicator 126.

In the illustrated embodiment, the resin applicator 126 includes a resin bath 128 and a nip roller 130. The resin bath 128 receives the veil-stabilized fabric portion 120. The veil-stabilized fabric portion 120 is immersed in a resin material within the resin bath 128 to apply to the resin material to the veil-stabilized fabric portion 120 to create a resin coated or wet veil-stabilized fabric portion 120. The resin bath 128 applies an amount of resin needed to reach a target size for the veil-stabilized fabric portion 120. In some embodiments, the resin material includes at least one of a metal, ceramic, or plastic. Embodiments of a plastic resin include thermoplastics and thermosets. Other resin materials may be used.

The illustrated resin applicator 126 also includes the nip roller 130 to remove excess resin applied to the veil-stabilized fabric portion 120. In some embodiments, the nip roller 130 modifies the veil-stabilized fabric portion 120 to reach a target geometry.

The wet veil-stabilized fabric portion 120 is fed to an applicator head 132. The applicator head 132 receives and positions the wet veil-stabilized fabric portion 120 relative to a winding mandrel 134. The applicator head 132 moves along one or more axes. The applicator head 132 may include sensors, motors, or other systems to monitor and manipulate the wet veil-stabilized fabric portion 120 during winding. Winding includes applying the wet veil-stabilized fabric portion 120 onto the winding mandrel 134.

In some embodiments, the winding mandrel 134 rotates to receive the veil-stabilized fabric portion 120 during winding to form a wet-fiber laminate on the winding mandrel 134. In other embodiments, the application head 132 may move around the mandrel 134 to wind the veil-stabilized fabric portion 120 onto the mandrel 134. In some embodiments, the resulting laminate is cured on the mandrel 134 or removed from the mandrel 134 and manipulated into a target form prior to curing, or otherwise processed during or after winding. In some embodiments, the winding mandrel 134 is a uniform cylinder. In other embodiments, the winding mandrel 134 has a non-uniform geometry.

Figure 2:
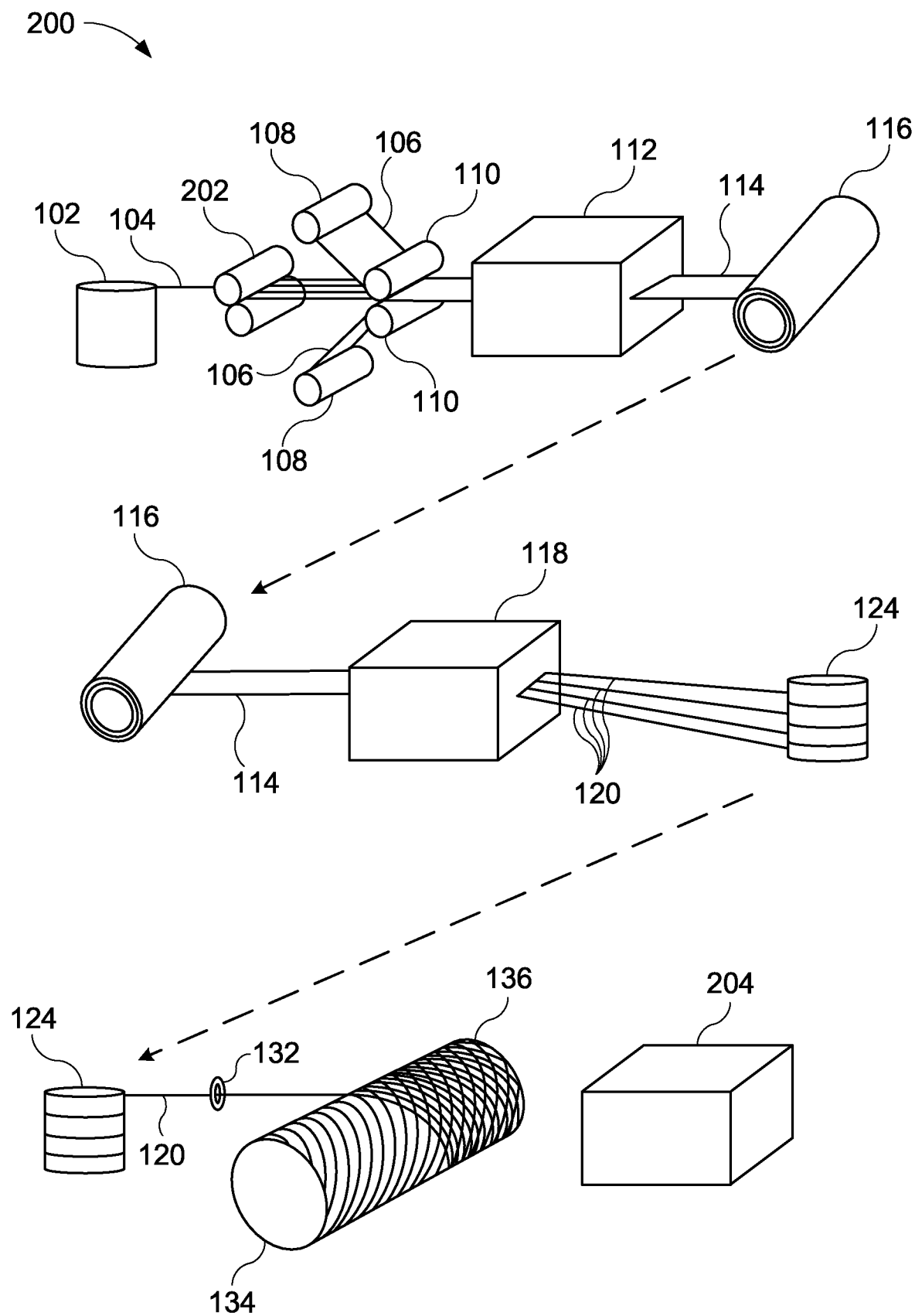
FIG. 2 is a schematic view of another filament winding system, according to one or more embodiments of the present disclosure.

FIG. 2 is a schematic view of another filament winding system 200, according to one or more embodiments of the present disclosure. In the illustrated embodiment, similar elements to those of the filament winding system 100 of FIG. 1 are labeled similarly.

In the illustrated embodiment, the tow 104 is drawn from the fiber creel 102 through a set of spreader bars 202. In some embodiments, the spreader bars 202 spread the fibers of the tow 104 for stabilization. Passing through the spreader bars 202 results in a flattening of the tow 104 and spreading or spacing of the fibers into a parallel orientation to form a unidirectional fabric. In some embodiments, as described above, one or more tows is fed to the spreader bars 202.

For clarity, the illustrated embodiment shows a single tow 104 stabilized with the veil 106. In other embodiments, multiple tows are fed from one or more creels 102, after which, the plurality of tows 104 are organized by the spreader bars 202, or other structures, and stabilized with the veil 106. Stabilizing the tows 104 provides advantage when aligning the plurality of tows 104. In some embodiments, the tows 104 are aligned relative to each other, aligned in a straight path, or otherwise oriented in a manner advantageous to subsequent processing such as slitting or winding. In some embodiments, multiple tows 104 are aligned parallel to one another. In some embodiments, the alignment is a generally planar sheet.

In some embodiments, the tow 104 is maintained in tension so that, after spreading the tow 104 or a plurality of tows, the fibers of the tow 104 remain spread as the veil 106 is applied. Once spread in tension, the veil 106 is applied to one or both sides (upper and/or lower) of the spread tow 104 to stabilize and preserve the unidirectional orientation of the spread tow 104. The veil 106 is bonded or attached to the tow 104 in the oven 112. In some embodiments, the oven 112 applies heat and pressure to attach the veil 106 to the tow 104.

The veil-stabilized fabric 114 is collected on a roll 116. The veil-stabilized fabric 114 is fed from the roll 116 into the slitter 118. In the illustrated embodiment, the slitter 118 separates the veil-stabilized fabric 114 into a plurality of veil-stabilized fabric portions 120. Each veil-stabilized fabric portion 120 includes one or more stabilized tows. In some embodiments, a cross-section of the veil-stabilized fabric portion 120 includes one or more tows aligned within the cross-section by the spreader bars 202. In other embodiments, the spreader bars 202 result in a more uniform cross-section than in embodiments without spreader bars 202.

Each veil-stabilized fabric portion 120 is collected on a creel or other collection structure 124. As described above with reference to FIG. 1, some embodiments omit the slitter 118 and provide the veil-stabilized fabric 114 to the collection structure 124.

The veil-stabilized fabric portion 120 is fed from the collection structure 124 to the application head 132. The application head 132 winds the veil-stabilized fabric portion 120 onto the winding mandrel 134 to form a veil-stabilized preform 136 on the winding mandrel 134.

In some embodiments, a layering or mixed lay-up winding process is applied. For example, in some embodiments, the veil-stabilized fabric portion 120 is wound to the winding mandrel 134 with unstabilized fabrics or tows according to a layering structure or pattern.

In some embodiments, the veil-stabilized preform 136 is removed from the mandrel 134 for further processing. In some embodiments, the veil-stabilized preform 136 has a form matching or similar to the mandrel 134. In other embodiments, the veil-stabilized preform 136 is loose and may be further formed such as laying flat and impregnating with resin. In some embodiments, the veil-stabilized preform 136 is edge-welded or seam-welded before or after removal from the mandrel 134. In the illustrated embodiment of FIG. 2, the veil-stabilized preform 136 is a dry-fiber preform. In other embodiments, the filament winding system 200 of FIG. 2 includes a resin bath 128 to create a wet-wound structure on the mandrel 134.

In other embodiments, the veil-stabilized preform 136 is heated with a heating element 204 to further bond the veil within the veil-stabilized preform 136. In further embodiments, the veil-stabilized preform 136 is seam-welded to secure loose edges in a dry-fiber veil-stabilized preform and to ease handling of the dry-fiber preform by preventing relative movement of adjacent layers that could cause fiber distortions. In other embodiments, the veil-stabilized preform 136 is impregnated with resin on the mandrel 134. Curing may be completed on the mandrel 134 by application of heat by the heating element 204 or after removal of the laminate from the mandrel 134 by an application of heat by the heating element 204.

Figure 3:
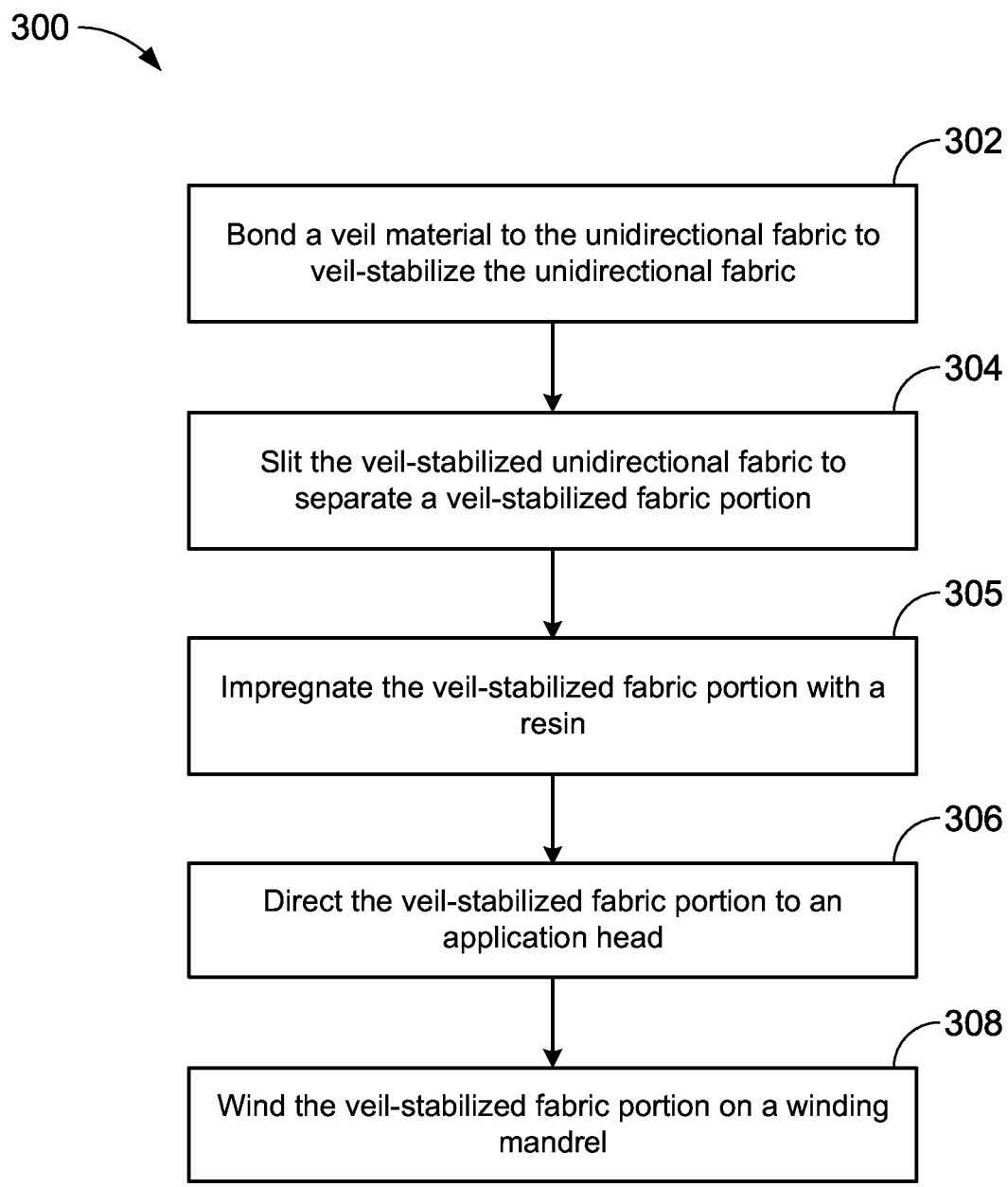
FIG. 3 is a schematic flow diagram of a method of filament winding, according to one or more embodiments of the present disclosure.

FIG. 3 is a schematic flow diagram of a method 300 of filament winding, according to one or more embodiments of the present disclosure. At block 302, the method 300 includes bonding a veil material to the unidirectional fabric to veil-stabilize the unidirectional fabric. In some embodiments, the veil material is chosen for its characteristics and interactions relative to the resin to be used. In some embodiments, the veil material is bonded through application of heat, chemical, or other bonding triggers. In some embodiments of the method 300, at block 302, spreader bars (i.e. spreader bars 202 of FIG. 2) are applied to spread and tension the unidirectional fabric prior to application of the veil.

At block 304, the veil-stabilized unidirectional fabric is slit to separate a veil-stabilized fabric portion. As described above, the veil-stabilized fabric portion may include a single tow or multiple tows. In some embodiments, the veil-stabilized portion is relatively large. One example of a large fabric portion may be characterized by a number of fibers within the fabric portion or a specific width of the veil-stabilized fabric portion regardless of the number of fibers. For example, a large fabric portion may incorporate 12,000 (12 k) to 48,000 fibers or be above $\frac{1}{8}^{th}$ inch in stabilized width regardless of fiber count. In other embodiments, the veil-stabilized fabric portion is a relatively small fabric portion. Examples of a small fabric portion have a fiber count less than 12 k or a stabilized width of $\frac{1}{8}^{th}$ inch or smaller. Other metrics or thresholds are contemplated. In some embodiments, the veil-stabilized fabric portion includes more or less than a quantity of fibers contained in a single tow.

At block 305, the veil-stabilized fabric portion is optionally impregnated with a resin. In some embodiments, the resin is applied with a resin bath. In other embodiments, the resin is applied using another process. The resin may be applied before winding, during winding, or after winding the veil-stabilized fabric portion to the mandrel.

In some embodiments, application of the resin includes applying the resin with a resin bath (i.e. resin bath 128 of the resin applicator 126 of FIG. 2). As described above, the resin may be applied to the veil-stabilized fabric portion prior to winding the veil-stabilized fabric portion to a winding mandrel. As described above, the resin bath may include resin application, application of other agents such as tougheners or sizing, nipping to remove excess resin or modify a geometry of the veil-stabilized fabric portion, and other elements to affect the veil-stabilized fabric portion.

At block 306, the veil-stabilized fabric portion is directed to an application head. In some embodiments, the application head moves along one or more axes. At block 308, the veil-stabilized fabric portion is wound on the winding mandrel. In some embodiments, the veil-stabilized fabric portion is wound to the winding mandrel by rotation of the winding mandrel. In other embodiments, the application head moves around a stationary winding mandrel. The winding mandrel has a geometry that facilitates rotation or provides a form for a part to be created using winding.

Figure 4:
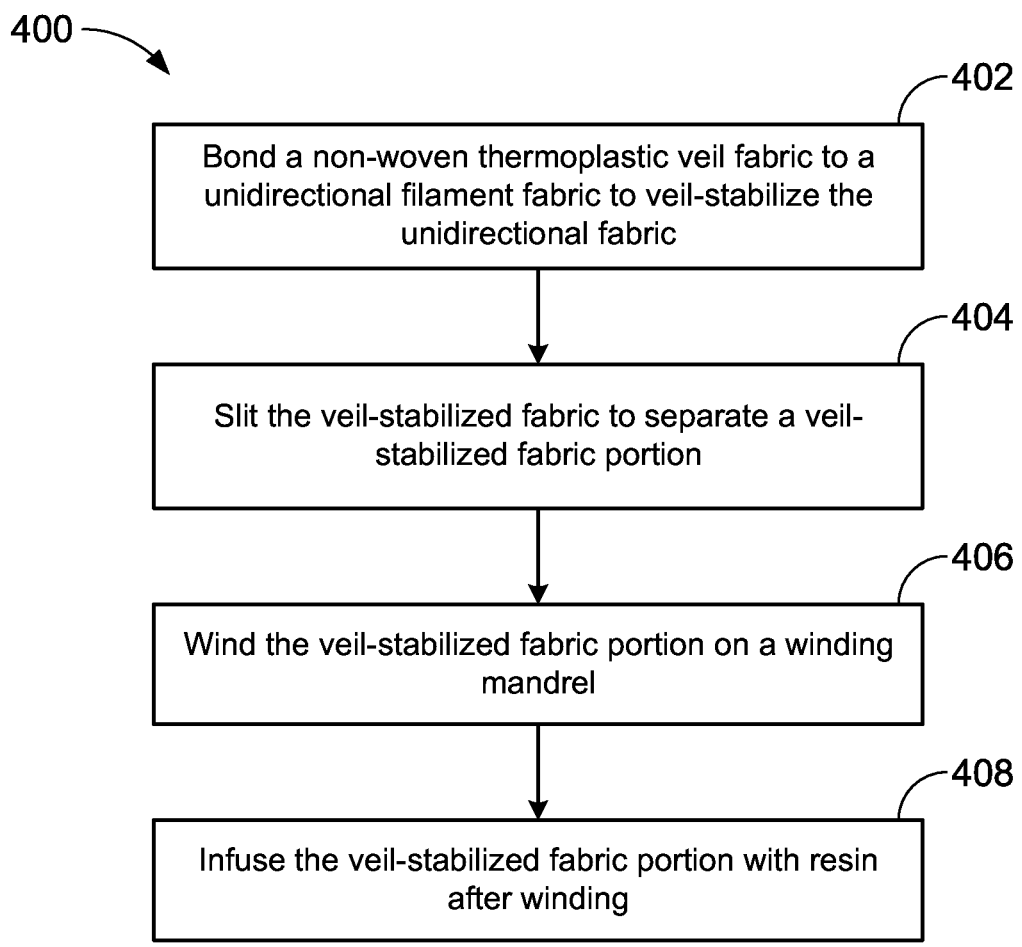
FIG. 4 is a schematic flow diagram of a method of winding a veil-stabilized composite, according to one or more embodiments of the present disclosure.

FIG. 4 is a schematic flow diagram of another method 400 of winding a veil-stabilized composite, according to one or more embodiments of the present disclosure. At block 402 of the method 400, a non-woven thermoplastic veil fabric is bonded to a unidirectional fabric to veil-stabilize the unidirectional fabric. The veil fabric may be bonded to the unidirectional fabric through application of heat, chemicals, and/or pressure.

At block 404, the veil-stabilized fabric is slit to separate a veil-stabilized fabric portion. In some embodiments, the fabric is slit to form a large veil-stabilized fabric portion or small veil-stabilized fabric portion as described above. At block 406, the veil-stabilized fabric portion is wound to a winding mandrel. At block 408, the veil-stabilized fabric portion is infused with resin after winding.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enables the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flowchart included herein are generally set forth as logical flowchart. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flowchart, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive.

All changes which come within the meaning and range of equivalency of the claims are to be embraced within their scope.

What is claimed is:

1. A method of filament winding, comprising:
bonding a veil material to a unidirectional fabric to veil-stabilize the unidirectional fabric, wherein the unidirectional fabric is a dry-fiber fabric;
slitting the veil-stabilized unidirectional fabric to separate a veil-stabilized fabric portion;
collecting the veil-stabilized fabric portion on a collection structure;
unspooling the veil-stabilized fabric portion from the collection structure;
impregnating the veil-stabilized fabric portion with a resin after the veil-stabilized fabric portion is veil-stabilized and after the veil-stabilized fabric portion is unspooled;
directing the veil-stabilized fabric portion to an application head after the veil-stabilized fabric portion is veil-stabilized and impregnated with the resin; and
winding the veil-stabilized fabric portion on a winding mandrel to form a wound veil-stabilized fabric portion on the winding mandrel, the wound veil-stabilized fabric portion having a lay-up arrangement on the winding mandrel in which a first section of the wound veil-stabilized fabric portion is arranged by the application head to be at an angle relative to a second section of the wound veil-stabilized fabric portion to form at least a portion of a layering structure of a part.

2. The method according to claim 1, wherein the bonding of the veil material to the unidirectional fabric to veil-stabilize the unidirectional fabric comprises applying heat and pressure to the veil material to bond the veil material to the unidirectional fabric.

3. The method according to claim 1, wherein the veil material comprises a thermoplastic material and the veil-stabilized fabric portion is stabilized with the thermoplastic material.

4. The method according to claim 1, further comprising removing the wound veil-stabilized fabric portion from the mandrel as a flat laminate.

5. The method according to claim 1, further comprising curing the wound veil-stabilized fabric portion after winding.

6. The method according to claim 1, wherein the impregnating of the veil-stabilized fabric portion.

7. The method according to claim 1, further comprising passing the veil-stabilized fabric portion through a nip roller to remove excess resin from the veil-stabilized fabric portion.

8. The method according to claim 1, wherein the collection structure comprises a creel.

9. The method according to claim 1, further comprising passing a tow over a spreader bar to form the unidirectional fabric before bonding the veil material to the unidirectional fabric.

10. The method according to claim 1, wherein the veil material comprises a non-woven fabric.

11. The method according to claim 1, wherein the slitting of the veil-stabilized unidirectional fabric comprises isolating one or more veil-stabilized tows from the unidirectional fabric.

12. The method according to claim 11, wherein the slitting of the veil-stabilized unidirectional fabric yields multiple veil-stabilized fabric portions.

13. The method according to claim 1, wherein the application head is configured to move along one or more axes.

14. The method according to claim 13, further comprising curing the wound veil-stabilized fabric portion after winding.

15. The method according to claim 1, wherein the slitting of the veil-stabilized unidirectional fabric yields multiple veil-stabilized fabric portions.

16. The method according to claim 2, further comprising curing the wound veil-stabilized fabric portion after winding.

17. The method according to claim 2, wherein the veil material comprises a nonwoven fabric.

18. The method according to claim 3, wherein the bonding of the veil material to the unidirectional fabric to veil-stabilize the unidirectional fabric comprises applying heat and pressure to the veil material to bond the veil material to the unidirectional fabric.

19. The method according to claim 6 further comprising passing the veil-stabilized fabric portion through a nip roller to remove excess resin from the veil-stabilized fabric portion.

20. The method according to claim 10, wherein the bonding of the veil material to the unidirectional fabric to veil-stabilize the unidirectional fabric comprises applying heat and pressure to the veil material to bond the veil material to the unidirectional fabric.

* * * * *